Feb. 1, 1949.  E. R. BEVERLEIGH  2,460,331
SAW FILING MACHINE
Filed Dec. 4, 1945
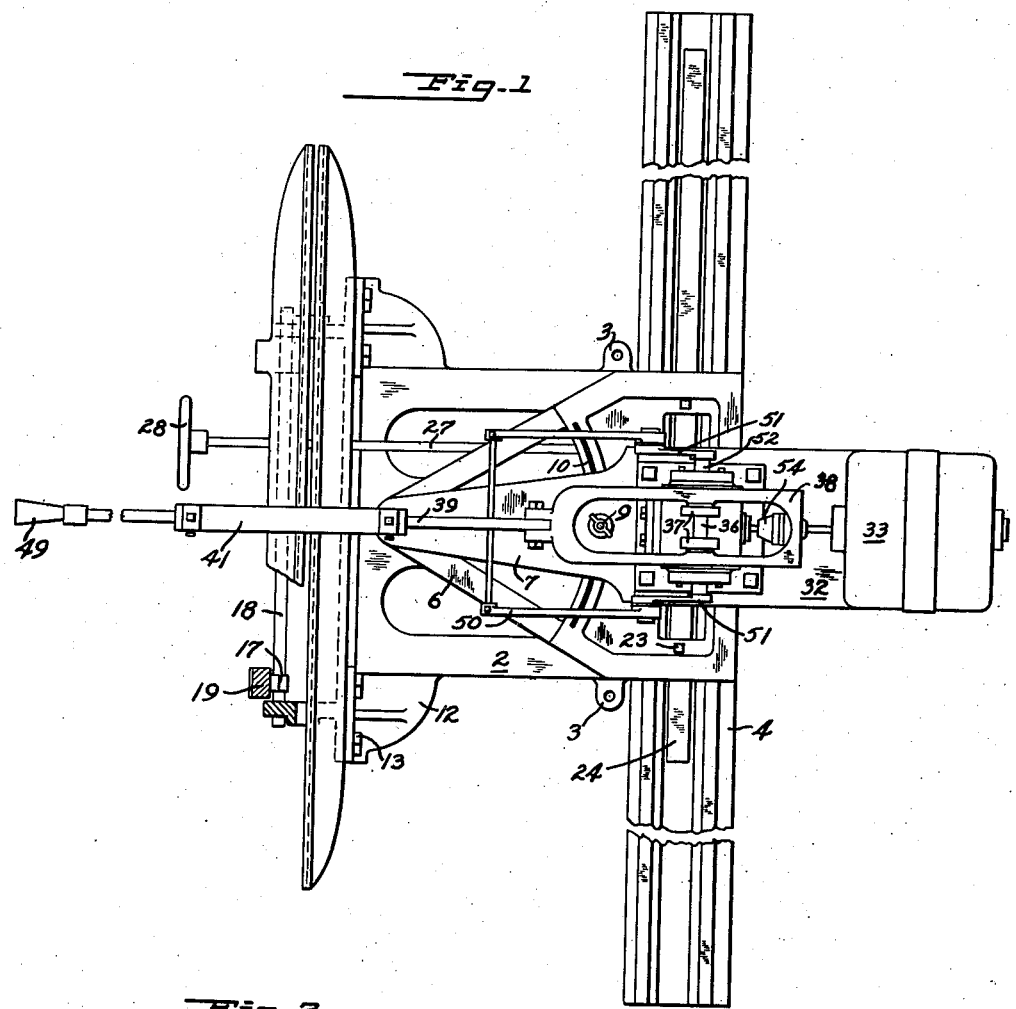
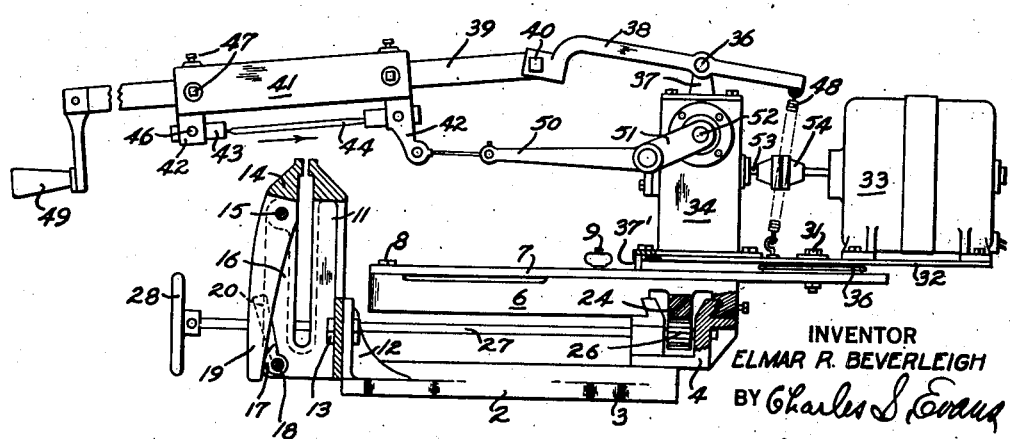
INVENTOR
ELMAR R. BEVERLEIGH
BY Charles S. Evans
his ATTORNEY Patented Feb. 1, 1949

2,460,331

UNITED STATES PATENT OFFICE 2,460,331

SAW-FILING MACHINE

Elmar R. Beverleigh, Oakland, Calif., assignor to Albert W. Shaw, San Francisco, Calif.

Application December 4, 1945, Serial No. 632,703

4 Claims. (Cl. 76—33)

My invention relates to machines for filing saws and particularly to a manually controlled machine for filing hand saws.

Objects of the invention include the provision of filing mechanism in which the elements of labor and speed are supplied by the machine, and the elements of skilled selection and control are supplied by the operator; the provision of a filing machine in which the selective control of the operator may be exercised in positioning the file with reference to the angle of cut, in the number of cutting strokes in a given position, in the lateral spacing of the file, and in the depth of cut made by the file.

The invention possesses other valuable features, some of which with the foregoing will be set forth at length in the following description where that form of the invention which has been selected for illustration in the drawings accompanying and forming a part of the preesnt specification is explained. In said drawings, one form of the invention is shown, but it is to be understood that it is not limited to that form, since the invention as set forth in the claims may be embodied in a plurality of forms.

Referring to the drawings, Figure 1 is a plan view of my filing machine; and Figure 2 is a side elevation thereof, partly in section.

In terms of broad inclusion, my saw filing machine comprises a bed plate upon which the rest of the mechanism is carried and which includes means for rigidly holding a saw which is to be filed. Mounted for manually controlled movement on the bed plate in a line parallel with the saw, is a carriage upon which the file holding and moving means is pivotally arranged, with provision for fixed major adjustment and minor manipulative control by the hands of the operator. Slidably arranged on a slide bar pivotally mounted on the carriage, is a file-holding carrier which moves back and forth transversely across the saw, the pivotal mounting of the slide-bar permitting selective manual control of the file in a vertical plane; and the pivotal mounting of the carriage permitting selective control of the file in a direction transverse to the vertical plane. Means for reciprocating the file carrier on the slide bar are also arranged on the carriage. With this mechanism, the highly specialized skill of the hand saw filer is supplemented by mechanism which does the hard work, leaving within the selective control of the operator, the skilled application of the file to the saw tooth.

In more detailed terms and referring to the drawings, my filing machine comprises a bed plate 2, having lugs 3, by which it may conveniently be secured to a bench or table. On one side, the bed plate is extended to provide ways 4, upon which the carriage 6 is slidably arranged. The carriage includes a floor plate 7, pivoted by the pin 8 to the main body, and fixed rigidly to the main body in adjusted position by a bolt 9 passing through a hole in the floor plate and an arcuate slot 10 in the main carriage body.

On the side of the bed plate opposite the ways is arranged saw holding means, preferably a fixed jaw 11, conveniently formed separately, and secured to integrally formed brackets 12 on the bed plate, by bolts 13; and a movable jaw 14, pivoted on a rod 15, carried by the upstanding bracket arms 16, formed integrally with the base of the fixed jaw. Cams 17 on the rod 18, journaled in the base of the bracket arm, bear against the lower ends of the arms 19 extending downwardly from each end of the movable jaw. The cams are turned by the handle 20 to clamp the movable jaw against and release it from the fixed jaw. This provides quick acting means for clamping a saw between the jaws for filing and releasing it after the filing is completed.

Means are provided for the manual control and movement of the carriage on the bed plate. Fixed on the underside of the carriage by screws 23, and extending a suitable distance on each side thereof is a rack 24, the teeth of which are in mesh with the pinion 26, fixed for rotation with the shaft 27, journaled in the bed plate and rotated by the hand wheel 28.

Means are provided on the carriage for holding a file and for imparting to the file-holding means a reciprocating movement across the saw-holding jaws at a selected angle. Such means include mechanisms which permit manual positioning of the file-holding means in a vertical plane together with manual control of the pressure with which the file engages the saw. Small lateral movements of the file are also within the manual control of the operator.

Pivotally mounted on the floor plate 7 by the bolt 31 is the base plate 32, carrying the electric motor 33 at one end and the housing 34 at the other end. Balls 36 in shallow races surrounding the pivot bolt, carry the weight of the base plate assembly while preserving the utmost ease of turning. A stop pin 37', fixed in the floor plate and engaging the ends of a recess in the edge of the base plate limits movement of the base plate relative to the carriage.

Pivotally mounted on the housing 34 by the shaft 36, which is supported in brackets 37, conveniently formed on the cover plate of the housing 34, is an arm conveniently made in two pieces, a broad, open center casting 38, and a rectangular cold rolled steel bar 39, which are held rigidly together at a selected angle by the bolt 40. The broad arm portion provides a stable mounting on the carriage assembly and the rectangular bar provides a slide for the file carrier 41 which comprises a box-like frame surrounding the slide bar and forming therewith a close running fit. The ends 42 of the frame extend downwardly to furnish seats for the cylindrical socket pieces 43 in which the ends of the file 44 seat. These socket pieces are both rotatably and axially adjustable in the frame ends 42; and set screws 46 lock them and the file in the selected angular setting. Gibs adjusted by the set screws 47 are provided between slide and carrier to take up wear; and a counterbalancing spring 48, connecting the free end of the arm 38 to the base plate, balances the weight of the carrier and greatly facilitates the manipulation of the file. Preferably, the tension of the spring is such that the parts are resiliently retained in about the position shown in Figure 2, the file being just above the saw. A handle 49, preferably offset downwardly from the end of the bar as shown, provides a convenient hold for one hand of the operator, while the other hand is on the hand wheel 28.

The file carrier is moved back and forth by a forked pitman rod 50, pivoted at its outer single end to the inner carrier end 42; and at its inner forked end to a pair of cranks 51, one of which is fixed on each end of the shaft 52 journaled in the housing 34. The pitman structure is quite light since the cutting or work stroke of the file is inwardly as shown by the arrow; and tensional stresses are the heavier ones. The shaft 52 is connected by a conventional worm-and-worm wheel bearing, located in the housing 34, to the shaft 53 which in turn is connected by flexible coupling 54 to the shaft of the motor 33.

*Operation.*—A hand saw is clamped between the jaws and a suitable file adjusted to proper position in the carrier, and the motor turned on. The operator requires both hands, one on the handle 49, and one on the hand wheel 28. Light downward pressure on the handle during the cutting stroke brings the file into engagement with a selected tooth, the necessary lateral movement being permitted by the pivotal mounting of the slide bar assembly on the carriage. One or more strokes of the file may be given, pressure being applied to the file downwardly and laterally as the critical judgment of the operator dictates.

On the recovery stroke, the file is raised and the hand wheel turned to move the carriage and the mechanism carried by it, a short distance laterally along the bed plate so as to position the file with reference to the next tooth to be dressed. Thus the operator proceeds along the saw, dressing alternate teeth. The saw is then reversed and the intervening teeth dressed.

In this operation, it has been assumed that the saw is a cross cut saw, in which the file travels across the saw at an angle both to the vertical and horizontal planes through the saw teeth. The angle to the horizontal plane is selected by adjustment of the angle between the two bar parts 38 and 39; and the angle to the vertical plane of the saw is selected by adjustment on the carriage of the floor plate about its pivot pin 8.

If a rip saw is to be filed, the file is held substantially perpendicular to the plane of the saw. Adjustment of the angle between the two parts of the bar, and adjustment of the floor plate permit a stroke of the file in the horizontal plane, which means that under some conditions, chiefly related to cut of file and character of steel in the saw, a rip saw can be filed all from one side. Usually however, because of the difference in the opposite edges of the tooth left by the file on entering and leaving in a cutting stroke, it is preferred to first file every other tooth and then reverse the saw to file the intervening teeth.

I claim:

1. A saw filing machine comprising a bed plate, a carriage assembly slidably mounted on the bed plate and including a floor plate pivotally adjustable on the carriage about a vertical axis and a base plate mounted on the floor plate for limited free movement thereon about a vertical axis, means on the bed plate for holding a saw, an arm pivotally mounted on the base plate for free movement about a horizontal axis and extending transversely of the saw, a carrier for mounting a file slidably arranged on the arm, a shaft journaled on the base plate and connected to reciprocate the carrier, means for rotating the shaft, and means on the arm by which downward and lateral pressures of the file on the saw may be manually controlled during movement of the file carrier.

2. A saw filing machine comprising a base plate, a shaft journaled on the base plate, driving means for the shaft mounted on said base plate, an arm pivotally mounted on the base plate, a carrier for mounting a file slidably arranged on the arm, means connecting the shaft and carrier for reciprocating the carrier, means for mounting the base plate for free pivotal movement through a small arc to permit manual lateral adjustment of the file to the saw, and means for mounting the base plate mounting means for adjusting movement through a wide arc to position the angular relation of the file to the saw.

3. A saw filing machine comprising a bed plate, a carriage slidably mounted on the bed plate, means on the bed plate for holding a saw, a base plate mounted on the carriage for limited free pivotal movement thereon about a vertical axis, a shaft journaled on the base plate, a crank fixed on the shaft for rotation in a plane transverse to a saw in the holding means, an arm pivoted about a horizontal axis on the base plate and extending transversely of the saw, a carrier for mounting a file slidably arranged on the arm, a rod connecting the crank and the file carrier, means for rotating the shaft, and means on the arm by which downward and lateral pressures of the file on the saw may be manually controlled during movement of the file carrier.

4. A saw filing machine comprising a bed plate, a carriage slidably mounted on the bed plate, means on the bed plate for holding a saw, a base plate mounted on the carriage for limited free pivotal movement thereon about a vertical axis, a shaft journaled on the base plate, a crank fixed on the shaft for rotation in a plane transverse to a saw in the holding means, an arm pivotally mounted on the base plate and extending transversely of the saw, a carrier for mounting a file slidably arranged on the arm, a rod connecting the crank and the file carrier, means for rotating the shaft, handle means on the arm for manually controlling the downward and lateral pressures of the file against the saw, and manually operated feed means for moving the carriage along the bed plate.

ELMAR R. BEVERLEIGH.

REFERENCES CITED

The following references are of record in the file of this patent:

UNITED STATES PATENTS

| Number | Name | Date |
|---|---|---|
| 82,047 | Van Nortwick | Sept. 8, 1868 |
| 118,403 | Sweetland | Aug. 22, 1871 |
| 146,017 | Parsons | Dec. 30, 1873 |
| 158,470 | Cleveland | Jan. 5, 1875 |
| 255,007 | Myers | Mar. 14, 1882 |
| 302,766 | O'Conner | July 29, 1884 |
| 454,679 | Erlandson | June 23, 1891 |
| 630,288 | Cornish | Aug. 1, 1899 |
| 847,804 | McAulay | Mar. 19, 1907 |
| 1,130,011 | Nordvall | Mar. 2, 1915 |
| 2,148,369 | Eastwood | Feb. 21, 1939 |

FOREIGN PATENTS

| Number | Country | Date |
|---|---|---|
| 63,768 | Germany | Aug. 15, 1892 |
| 530,875 | France | Jan. 3, 1922 |
| 596,902 | France | Nov. 4, 1925 |